United States Patent
Shieh et al.

(10) Patent No.: US 7,716,554 B2
(45) Date of Patent: May 11, 2010

(54) SYSTEM AND METHOD FOR BLIND TRANSPORT FORMAT DETECTION WITH CYCLIC REDUNDANCY CHECK

(75) Inventors: Shin-Lin Shieh, Kinmen County (TW); Shyh-Tzong Kuo, Hsinchu County (TW); Po-Ning Chen, Hsinchu (TW); Yung-Hsiang Han, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1144 days.

(21) Appl. No.: 11/183,345

(22) Filed: Jul. 18, 2005

(65) Prior Publication Data

US 2007/0033478 A1    Feb. 8, 2007

(51) Int. Cl.
H03M 13/00    (2006.01)
(52) U.S. Cl. .................. 714/758; 714/792; 370/335
(58) Field of Classification Search .............. 714/758, 714/792; 370/335, 342, 150
See application file for complete search history.

(56) References Cited

U.S. PATENT DOCUMENTS 7,336,735 B2 * 2/2008 Traeber ..................... 375/341

2002/0108090 A1 * 8/2002 Ariel et al. .................. 714/792
2003/0108011 A1 * 6/2003 Lee et al. .................... 370/335
2006/0117245 A1 * 6/2006 Fisher-Jeffes et al. ....... 714/792

FOREIGN PATENT DOCUMENTS

| EP | 1 207 659 A2 | 5/2002 |
| EP | 1 187 343 A3 | 10/2003 |
| EP | 1 387 516 A1 | 4/2004 |

OTHER PUBLICATIONS

Okumura et al., "Variable-Rate Data Transmission with Blind Rate Detection for Coherent DS-CDMA Mobile Radio", *IEICE Trans. Commun.*,vol. E81-B, No. 7, Jul. 1998.
"Multiplexing and Channel Coding (FDD)", *3GPP Tech. Spec.*, TS 25, 212 V3.9.0, Mar. 2002.

* cited by examiner

*Primary Examiner*—Sam Rizk
(74) *Attorney, Agent, or Firm*—Alston & Bird LLP (57) ABSTRACT

A method for BTFD decoding of signals having at least a message block of k-bit from a length candidate set $S=\{s_1, s_2, \ldots s_i\}$, wherein the k message bits are encoded by a CRC encoder and processed by an (n, 1, m) convolutional encoder to generate encoded data that includes decoding a received frame to form a decoded sequence that includes an $s_i$-bit message and an error correcting code, calculating a $\delta(s_i)$ value, comparing $\delta(s_i)$ with a threshold value, repeating the decoding and calculating steps if $\delta(s_i)$ is greater than the threshold, and updating the threshold to be $\delta(s_i)$ if $\delta(s_i)$ is less than or equal to the threshold.

30 Claims, 6 Drawing Sheets

SYSTEM AND METHOD FOR BLIND TRANSPORT FORMAT DETECTION WITH CYCLIC REDUNDANCY CHECK

BACKGROUND OF THE INVENTION

The present invention generally relates to data transmission technology for communication systems. More particular, the present invention relates to a system and a method for blind transport format detection with cyclic redundancy check.

Digital communication utilizes various data transmission methods that convert information such as voice signal into bits of digital message, and transmit the bits of information after conversion. It is common in many communication systems that the length of transmitted message blocks is not fixed, but varies from time to time. Therefore, additional information regarding the length of a transmitted message is required for the receiver so to de-block the message. However, in certain specific applications, the data rate is prohibitively low such that the transmission of additional length information becomes an inefficient burden to the overall system. An example is the AMR 12.2 kbps mode of UMTS WCDMA, in which the transmission overhead for message length may be at a maximum of 3 kbps, which is only about 25% of the 12.2 kbps data rate. Alternatively, some error correcting codes transmitted in accompanying the message bits can be employed to convey the length information. In WCDMA, cyclic redundancy check (CRC) bits affixed to the message bits have been widely applied to detect the length information of a corresponding message block. This is known as Blind Transport Format Detection (BTFD).

Figure 1:
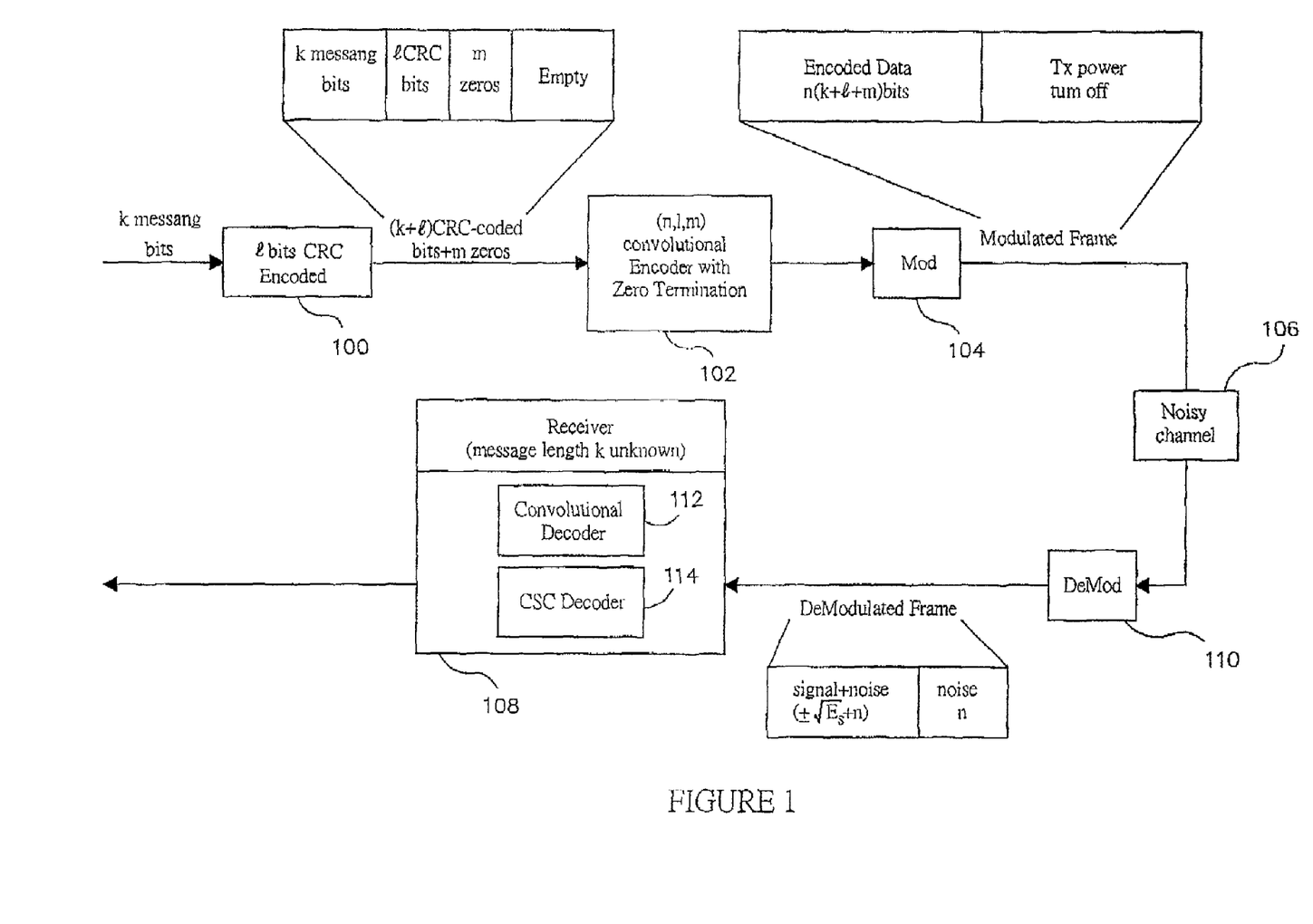
FIG. 1 is a block diagram of a conventional communication system using BTFD.

FIG. 1 is a block diagram of a conventional communication system using BTFD. Referring to FIG. 1, a message block of k-bit is provided, wherein the message length k is chosen from a length candidate set $S=\{s_1, s_2, \ldots s_i\}$ with a finite set size, wherein i is an integer. The message bits are first CRC-encoded by an l-bit CRC encoder 100 and thereafter processed by an (n, l, m) convolutional encoder 102 to generate encoded data. It is noted that additional m zeros are padded after CRC-encoded message block to terminate the trellis of convolutional codes. An example of a trellis diagram of a convolutional code is illustrated in FIG. 2.

The encoded data are modulated by a modulator 104 to form a modulated frame to be transmitted through a noisy channel 106. A receiver 108 receives the modulated frame, together with noise, through the noise channel 106. As shown in FIG. 1, the receiver 108 includes a demodulator 110 to demodulate the received frame and generate a corresponding demodulated frame. The receiver 108 further includes a convolutional decoder 112 and a CRC decoder 114 so that the demodulated frame can be decoded and the unknown message length k can be determined accordingly.

Generally, a message length $\tilde{k}$ is accepted as a legitimate candidate only when the all-zero state on the decoding trellis of the convolutional code gives the smallest path metric among all nodes at the same trellis time index ($\tilde{k}$+l+m), and meanwhile, the validity test of the CRC bits is performed and verified. FIG. 2 illustrates an example of a trellis diagram of a convolutional code, wherein the size of length set is 6 and the message length is $k=s_4$.

Figure 2:
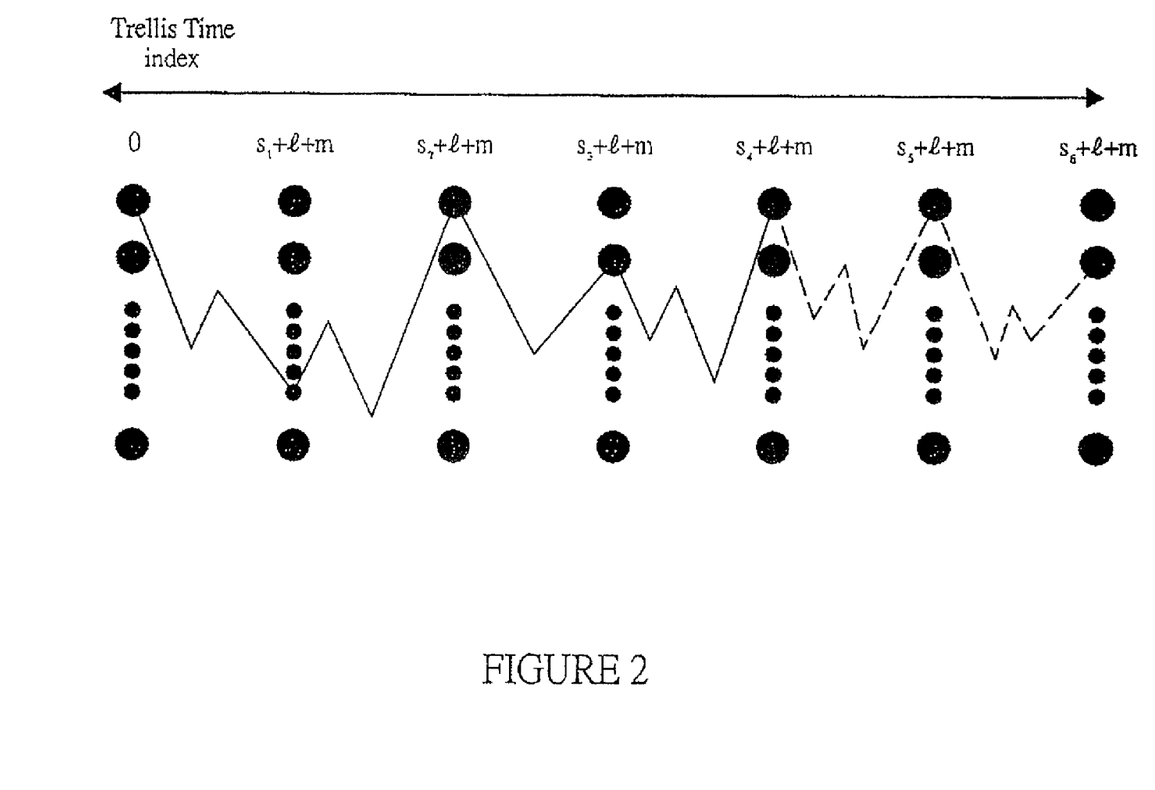
FIG. 2 is an example of a trellis diagram of a convolutional code.

The candidate message length set $S=\{s_1, s_2, \ldots\}$ is known to the receiver 108 Referring to FIG. 2, if the true message length k equals $s_i$, it is most likely that the correct trellis path of the Viterbi decoder ends at the zero state at trellis time index ($s_i$+l+m). On the other hand, at the incorrect trellis path ($s_j$+l+m) with $s_j \neq s_i$, the path metric value at the zero state is smaller than the maximum path metric that belongs to the correct trellis path. After the correct trellis time index ($s_i$+l+m), the input to the Viterbi decoder is purely noise and, therefore, the path metric values become random variables. The variables may be defined as follows:

$$\delta(s_k) = -10 \log\left(\frac{\lambda_0(s_k) - \lambda_{min}(s_k)}{\lambda_{max}(s_k) - \lambda_{min}(s_k)}\right), \quad (1)$$

where $\lambda_0(s_k)$, $\lambda_{max}(s_k)$ and $\lambda_{min}(s_k)$ are respectively zero-state, maximum, minimum path-metric values among all survivors at the targeted trellis time index ($s_k$+l+m). The range of $\delta(s_k)$ is $0 \leq \delta(s_k) \leq +\infty$ where $\delta(s_k)=0$ if $\lambda_0(s_k)=\lambda_{max}(\lambda_k)$ and $\delta(s_k) \underline{\Delta} +\infty$ if $\lambda_0(s_k)=\lambda_{min}(s_k)$.

In a noiseless transmission, $\delta(k)$ corresponding to the true message length k always equals zero. For other surmised message length candidate, the variables may be expressed as $\delta(s_j)$ with $s_j \neq k$, $\delta(s_j) \geq 0$ and $\delta(s_j)=0$ with probability $2^{-m}$ for $|s_j - k| \geq m$.

In a noisy transmission, $\delta(k)$ is unlikely to equal zero. Accordingly, the test using the information provided by path metrics should be lessened. Otherwise, the probability of detection will not satisfy the system requirements. For message length candidate so, a convention method compares $\delta(s_i)$ with a threshold $\Delta$ where the threshold $\Delta$ is a design parameter. If $\delta(s_i) \leq \Delta$, the test criterion using the information provided by path metrics is considered acceptable. The Viterbi decoder can trace back and output block with ($s_i$+l)-bit for further CRC processing.

Figure 3:
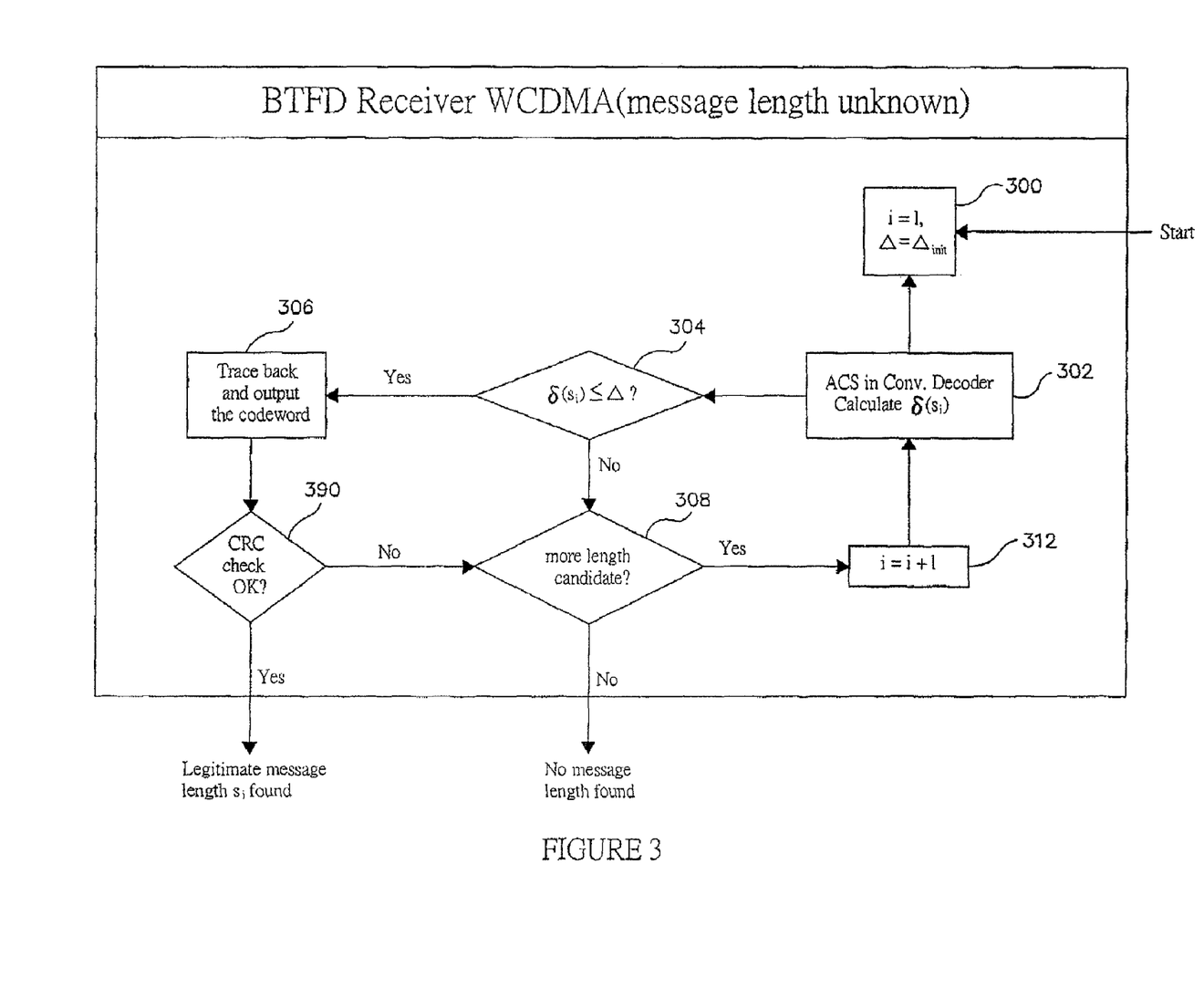
FIG. 3 is a flow chart of a conventional BTFD method.

FIG. 3 is a flow chart of a conventional BTFD method described by Y. Okumura and F. Adachi in "Variable-Rate Data Transmission with Blind Rate Detection for Coherent DS-CDMA Mobile Radio," *IEICE Trans. Commun.*, vol. E81-B, No. 7, July, 1998. As shown in FIG. 3, i is first reset to one and a threshold $\Delta$ is first set to a predetermined and fixed threshold $\Delta_{init}$ at step 300. The corresponding $\delta(s_i)$ value is calculated according to equation (1) above for each length candidate $s_i$ at step 302 and compared to the predetermined threshold $\Delta_{init}$ at step 304. If the value of the present $\delta(s_i)$ is found to be greater than the threshold $\Delta_{init}$ at step 304, the flow proceeds to step 308 to determine whether an additional length candidate is available. If there is, the flow proceeds to step 312 to increase the value i by one and then returns to step 302; otherwise, the decoding process is completed, indicating no message length is found for the received frame. If the value of the present $\delta(s_i)$ is found to be less than or equal to the threshold $\Delta_{init}$ at step 304, a Viterbi decoder traces back the received frame so as to output ($s_i$+l)-bit block at step 306. The ($s_i$+l)-bit block is thereafter subject to CRC processing by a CRC decoder at step 310. If the ($s_i$+l)-bit block passes the CRC test, the decoding process is completed, indicating that a legitimate message length is found; otherwise, the flow proceeds to step 308.

Figure 4:
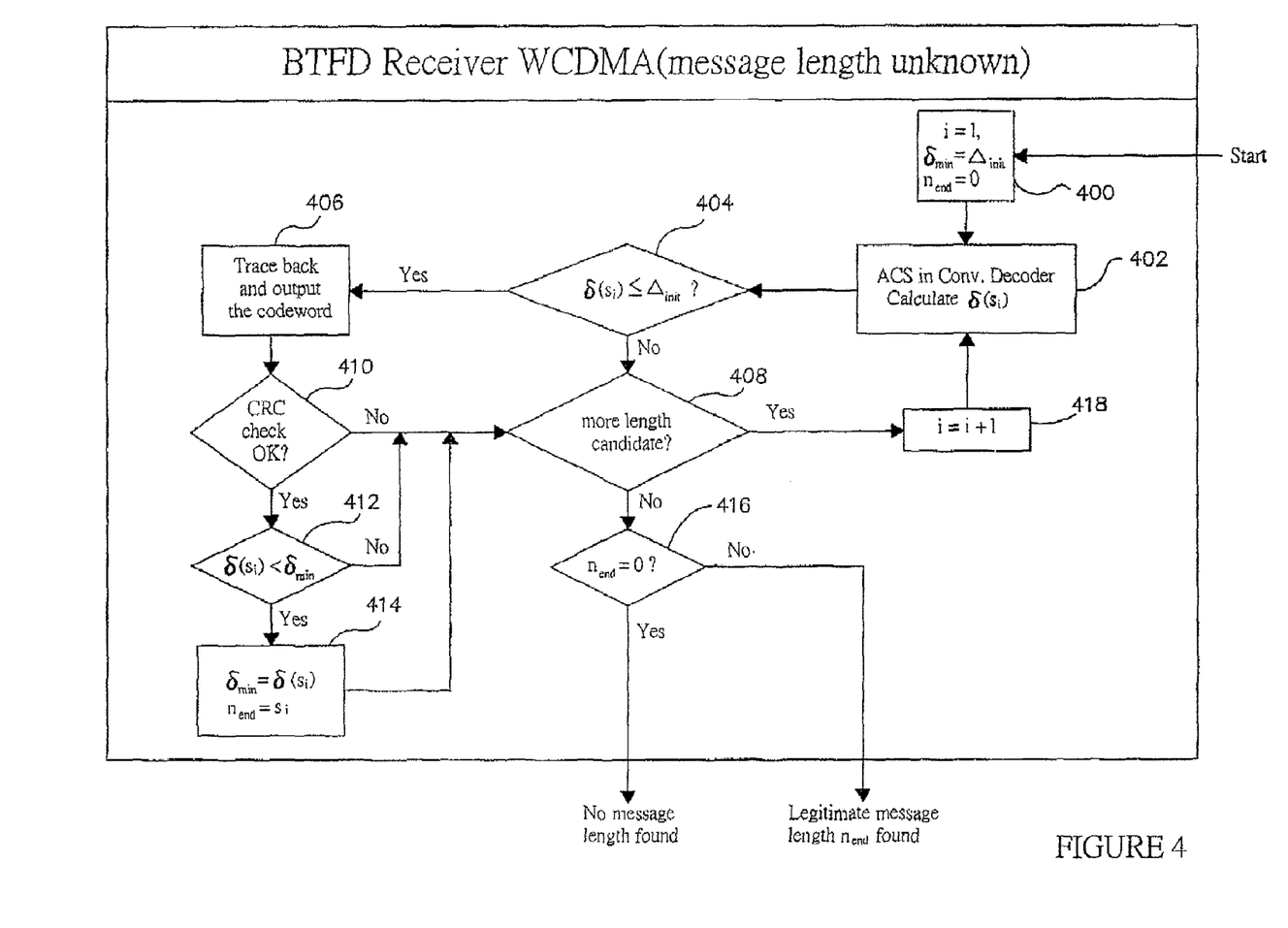
FIG. 4 is a flow chart of another conventional BTFD method.

FIG. 4 is a flow chart of another conventional BTFD method as described in "Multiplexing and channel coding (FDD)," 3GPP Tech. Spec., TS 25,212 V3.9.0, March 2002. In this approach, the decoding process searches from the first length candidate to the last length candidate. If more than one legitimate message lengths are found, the decoder will output the one with the lowest $\delta$ value.

As shown in FIG. 4, i is first reset to one, $\delta_{min}$ is preset to $\Delta_{init}$ and $n_{end}$ is reset to zero at step 400. The corresponding $\delta(s_i)$ value is calculated according to equation (1) for each length candidate $s_i$ at step 402 and compared to the predetermined threshold $\Delta_{init}$ at step 404. If the value of the present $\delta(s_i)$ is found to be greater than the threshold $\Delta_{init}$ at step 404, the flow proceeds to step 408 to determine whether any additional candidate is available. If there is, the flow proceeds to step 418 to increase the value i by one and then returns to step 402; otherwise, the flow proceeds to step 416 to determine whether $n_{end}$ is equal to zero. If $n_{end}$ is found to be equal to zero, the decoding process is completed, indicating that no message length is found for the received frame; otherwise, a legitimate message length is found to be $n_{end}$.

Returning to step 404, if the value of the present $\delta(s_i)$ is found to be less than or equal to the threshold $\Delta_{init}$, a Viterbi decoder traces back the received frame so as to output $(s_i+1)$-bit block at step 406. The $(s_i+1)$-bit block is thereafter subject to CRC processing by a CRC decoder at step 410. If the $(s_i+1)$-bit block does not pass the CRC test, the flow proceeds to step 408 for further processing. If the $(s_i+1)$-bit block passes the CRC test at step 410, the present value of $\delta(s_i)$ is compared to $\delta_{min}$ at step 412. If $\delta(s_i)<\delta_{min}$, a legitimate message length with better $\delta$ is found, $\delta_{min}$ is therefore set to the present value of $\delta(s_i)$, $n_{end}$ is set to $s_i$, at step 414 and the flow proceeds to step 408. If $\delta(s_i)$ is found to be not less than $\delta_{min}$ at step 412, a legitimate message length is found but the present legitimate message length is not better than the previous one, and thus the flow proceeds to step 408.

When the legitimate message length is found, the present $\delta$ value is compared with the previous one at step 412. The present $\delta$ value is known before returning to previous steps of the flow and CRC decoding. Given one legitimate message block with length $s_i$ and delta value $\delta(s_i)$ is found, it is unnecessary for other length candidates with a delta value between $\Delta_{init}$ and $\delta(s_i)$ to trace back to earlier steps and provide CRC processing again. Even if the CRC test is passed, the previous message legitimate block with length $s_i$ is still better than the current one.

BRIEF SUMMARY OF THE INVENTION

The present invention is directed to a system and a method for blind transport format detection with cyclic redundancy check that obviate one or more problems resulting from the limitations and disadvantages of the prior art.

In accordance with an embodiment of the present invention, there is provided a method for BTFD decoding of signals having at least a message block of k-bit from a length candidate set $S=\{s_1, s_2, \ldots s_i\}$, wherein the k message bits are encoded by a CRC encoder and processed by an (n, 1, m) convolutional encoder to generate encoded data, comprising: initializing a value of i; decoding a received frame to form a decoded sequence that includes an $s_i$-bit message and an error correcting code, calculating $\delta(s_i)$ values; comparing $\delta(s_i)$ with a threshold value; repeating the decoding and calculating steps if $\delta(s_i)$ is greater than the threshold; and updating the threshold to be $\delta(s_i)$ if $\delta(s_i)$ is less than or equal to the threshold.

In accordance with another embodiment of the present invention, there is provided a method for BTFD signal processing of at least a message block of k-bit from a length candidate set $S=\{s_1, s_2, \ldots s_i\}$, comprising: encoding the k message bits with a CRC encoder; processing the encoded message bits by an (n, 1, m) convolutional encoder; receiving the encoded message; initializing a value of i; decoding a received frame to form a decoded sequence that includes an $s_i$-bit message and an error correcting code, calculating $\delta(s_i)$ values; comparing $\delta(s_i)$ with a threshold value; repeating the decoding and calculating steps if $\delta(s_i)$ is greater than the threshold; and updating the threshold to be $\delta(s_i)$ if $\delta(s_i)$ is less than or equal to the threshold.

In accordance with yet another embodiment of the present invention, there is provided a method for BTFD decoding of signals having at least a message block of k-bit from a length candidate set $S=\{s_1, s_2, \ldots s_i\}$, wherein the k message bits are encoded by a CRC encoder and processed by an (n, 1, m) convolutional encoder to generate encoded data, comprising: (a) decoding the received frame to form a decoded sequence that includes an $s_i$-bit message and an error correcting code; (b) calculating $\delta(s_i)$ values for all message length candidates within the message length candidate set; (c) sorting a plurality of $\delta(s_i)$ values in an order; (d) tracing back the decoded sequence associated with $\delta(s_{(j)})$; (e) proceeding to step (g) if the decoded sequence is not associated with the error correcting code; (f) setting j to an integer within the integer set other than an earlier integer within an integer set; and (g) repeating steps (d)-(f) until all integers within the integer set, is exhausted.

In accordance with one other embodiment of the present invention, there is provided a method for BTFD decoding of signals having at least a message block of k-bit from a length candidate set $S=\{s_1, s_2, \ldots s_i\}$, wherein the k message bits are encoded by a CRC encoder and processed by an (n, 1, m) convolutional encoder to generate encoded data, comprising: (a) decoding the received frame to form a decoded sequence that includes an $s_i$-bit message and an error correcting code; (b) calculating $\delta(s_i)$ values for all message length candidates within the message length candidate set; (c) sorting all $\delta(s_i)$ values in a particular order; (d) setting j to a first integer within an integer set $\{1, 2, \ldots, N\}$; (e) tracing back the decoded sequence associated with $\delta(s_{(j)})$; (f) proceeding to step (h) when the decoded sequence is not associated with the error correcting code; (g) setting j to a second integer within the integer set other than the one integer within the integer set; and (h) repeating steps (e)-(g) until all integers within the integer set is exhausted.

In accordance with a further embodiment of the present invention, there is provided a system for BTFD decoding of signals having at least a message block of k-bit from a length candidate set $S=\{s_1, s_2, \ldots s_i\}$, wherein the k message bits are encoded by a CRC encoder and processed by an (n, 1, m) convolutional encoder to generate encoded data. The system comprises means for setting a threshold $\Delta$ to an initial value $\Delta_{init}$, means for decoding the received frame to form a decoded sequence that includes an $s_i$-bit message and an error correcting code, means for calculating $\delta(s_i)$ values, means for tracing back the decoded sequence if $\delta(s_i)$ is smaller than the threshold, means for checking error correcting code, and means for updating the threshold to be $\delta(s_i)$.

In accordance with a yet further embodiment of the present invention, there is provided a system for processing a received frame. The system comprises means for providing a message length candidate set $S=\{s_1, s_2, \ldots, s_N\}$, means for decoding the received frame to form a decoded sequence that includes an $s_i$-bit message and an error correcting code, means for calculating $\delta(s_i)$ values for all message length candidates within the message length candidate set, means for sorting all $\delta(s_i)$ values in a ascending order $\delta(s_{(1)}) \leq \delta(s_{(2)}) \leq \ldots$ and $s_{(j)}$ being the message length candidate corresponding to the j-th smallest a value, means for setting j to one integer within an integer set $\{1, 2, \ldots, N\}$, means for tracing back the decoded sequence associated with $\delta(s_{(j)})$, means for checking the error correcting code, means for setting j to another integer within the integer set other than the one integer within the integer set, and means for repeating steps of tracing back the decoded sequence associated with $\delta(s_{(j)})$, checking the error correcting code and setting j to another integer within the integer set other than the one integer within the integer set until all integers within the integer set is exhausted.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the present invention and together with the description, serves to explain the principles of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

A communication system using BTFD includes at least a message block of k-bit, wherein the message length k is chosen from a length candidate set $S=\{s_1, s_2, \ldots s\}$ with a finite set size, and i is an integer. The message bits are first CRC-encoded by an l-bit CRC encoder and thereafter processed by an (n, l, m) convolutional encoder to generate encoded data.

Figure 5:
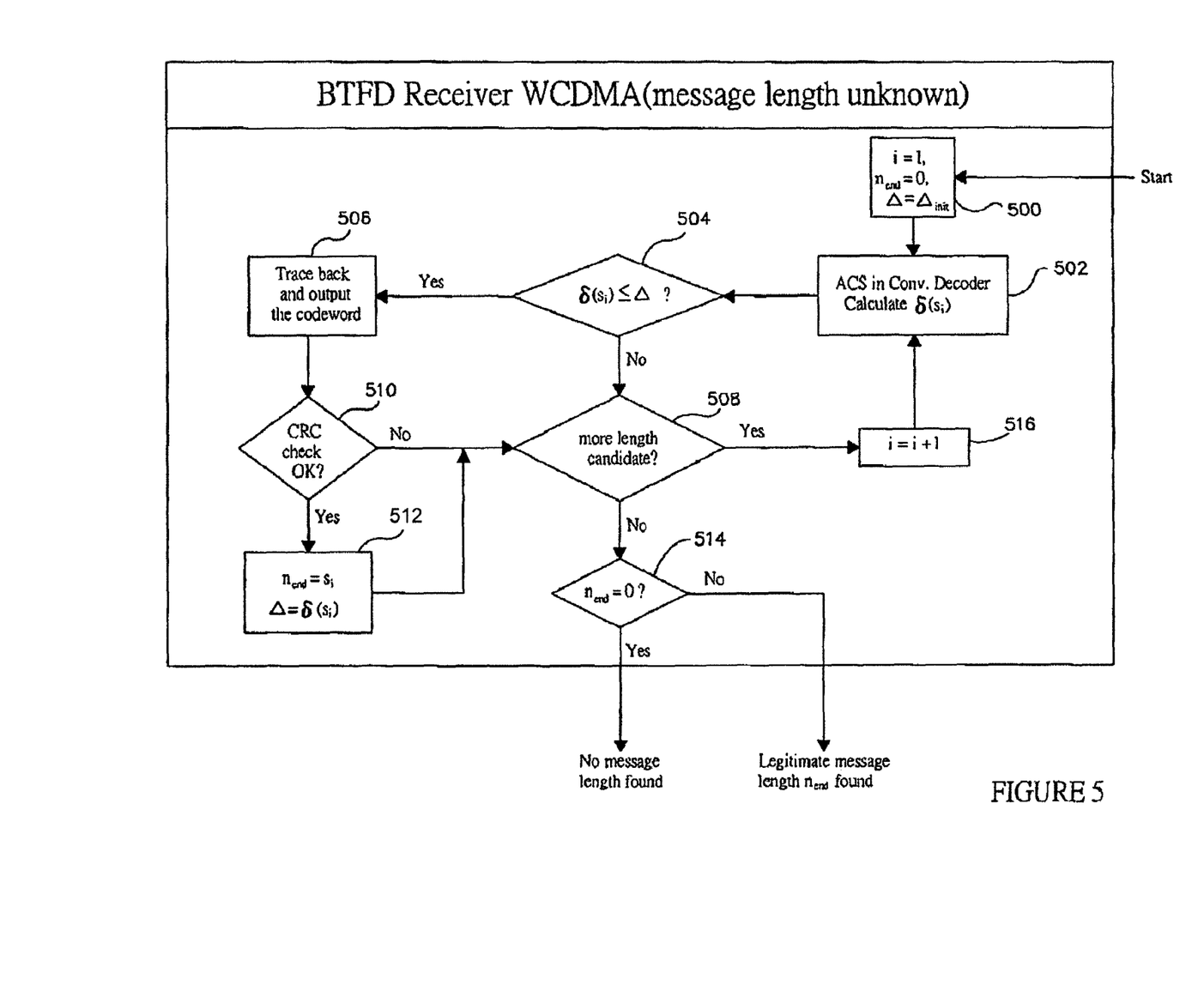
FIG. 5 is a flow chart of a BTFD method in accordance with one embodiment of the present invention.

FIG. 5 is a flow chart of a BTFD method in accordance with one embodiment of the present invention. According to the present invention, the decoding process searches from the first length candidate to the last length candidate. If more than one legitimate message lengths are found, the decoder will output the one with the lowest δ value. Referring to FIG. 5, the method of the present invention starts at step 500 by resetting i to one, $\Delta$ to $\Delta_{init}$ and $n_{end}$ to zero. The corresponding $\delta(s_i)$ value is calculated according to equation (1) described above for each length candidate s, at step 502 and compared to a predetermined threshold $\Delta$ at step 504. If the value of the present $\delta(s_i)$ is greater than the threshold $\Delta$, the flow proceeds to step 508 to determine whether more length candidate is available. If there is, the flow proceeds to step 516 to increase the value i by one and then returns to step 502. Otherwise, the flow proceeds to step 514 to determine whether $n_{end}$ is equal to zero. If fend is equal to zero, the decoding process is completed, indicating no message length is found for the received frame. Otherwise, a legitimate message length $n_{end}$ is found.

Returning to step 504, if the present value of the $\delta(s_i)$ is less than or equal to the threshold $\Delta$, a Viterbi decoder traces back the received frame so as to output $(s_i+1)$-bit block at step 506. The $(s_i+1)$-bit block is thereafter subject to CRC processing by a CRC decoder at step 510. If the $(s_i+1)$-bit block does not pass the CRC test, the flow proceeds to step 508 for further processing. If the $(s_i+1)$-bit block passes the CRC test, the threshold $\Delta$ is therefore updated to the present value of $\delta(s_i)$ and $n_{end}$ is set to s, at step 512.

According to the present invention, FIG. 5 discloses a system and a method for dynamically adjusting the threshold $\Delta$ after the appearance of a legitimate message block. If the legitimate message block with length $s_i$ and delta value $\delta(s_i)$ is found, the threshold value $\Delta$ is changed to $\delta(s_i)$. By dynamically adjusting the threshold $\Delta$, disfavored trace backs and CRC testing are obviated for candidate message block with a δ value between $A_{init}$ and $\delta(s_i)$.

Figure 6:
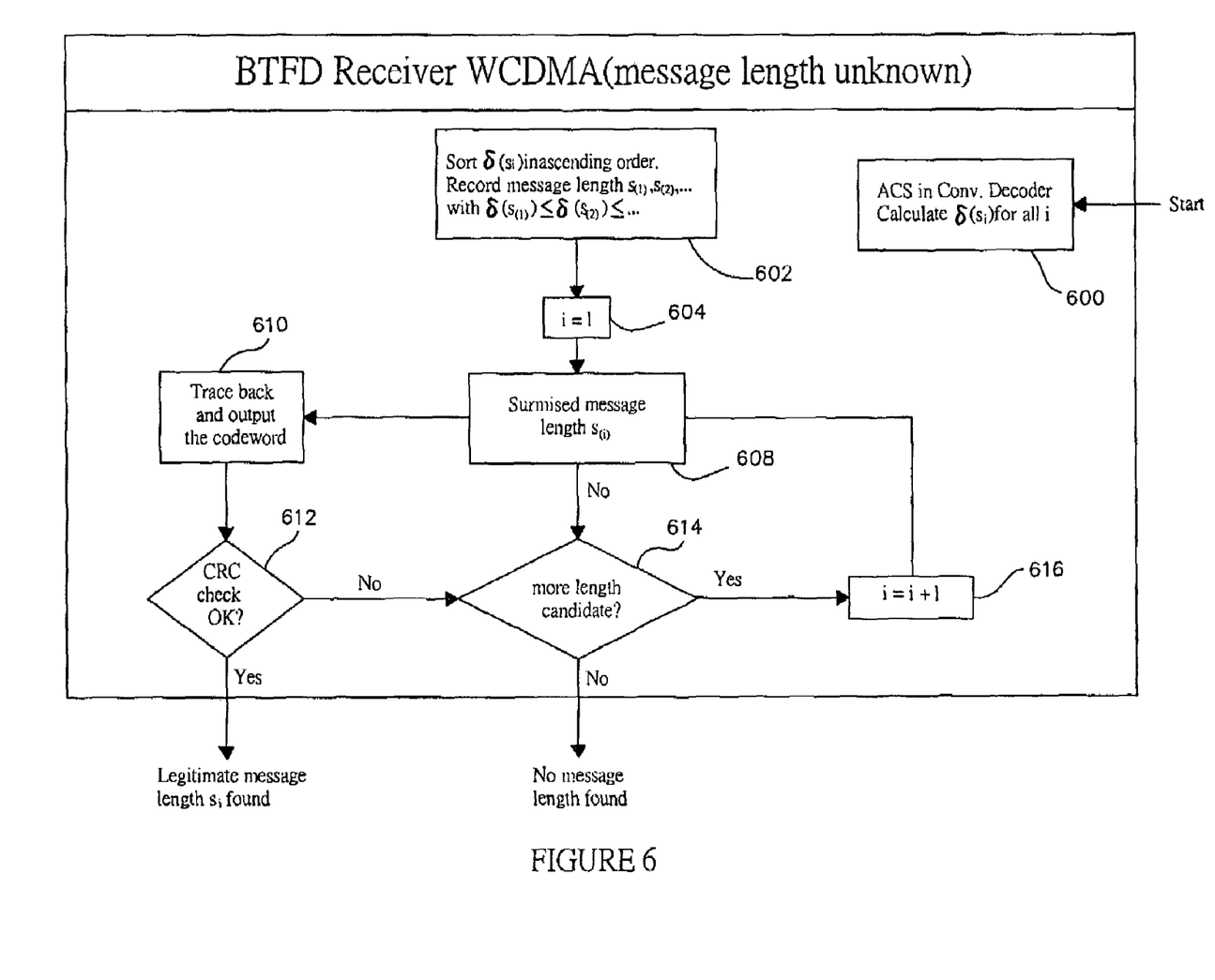
FIG. 6 is a flow chart of a BTFD method in accordance with another embodiment of the present invention.

Referring to FIG. 6, a flow chart of a BTFD method in accordance with another embodiment is depicted. In this embodiment, the number of trace backs, or repetitions, in the Viterbi decoder can be further decreased. For all length candidates, the lower the δ value, the more likely the true message block may be. Therefore, in this embodiment, all of the δ values for all length candidates are calculated and stored first, and then all of the δ values are sorted in an order, such as in an ascending order. Trace back from the length candidate with the lowest δ value to the one with the highest δ value until the first legitimate message block is found or all length candidates are exhausted.

As shown in FIG. 6, all δ for all candidate message lengths $s_i$ in the length set $S=\{s_1, s_2, \ldots\}$ are calculated according to equation (1) and stored in a memory device at step 600. Referring to step 602, all δ values are thereafter sorted in an order, such as in an ascending order in the form of $\delta(s_{(1)}) \leq \delta(s_{(2)}) \leq \ldots$, where $s_{(j)}$ is the message length corresponding to the j-th smallest δ value. The value of the variable j is preset to one at step 604 and a surmised message length $s_{(j)}$ is provided at step 608. Next, a Viterbi decoder traces back the received frame so as to output $(s_{(j)}+1)$-bit block at step 610. The $(s_{(j)}+1)$-bit block is thereafter subject to CRC checking by a CRC decoder at step 612. If the $(s_{(j)}+1)$-bit block passes the CRC test, the decoding process is completed, indicating that a legitimate message length has been found as $s_{(j)}$. If, however, the $(s_{(j)}+1)$-bit block does not pass the CRC test, the flow proceeds to step 614 to determine whether more length candidate is available. If there is, the flow proceeds to step 616 to increase the value j by one and then returns to step 608. Otherwise, the decoding process is completed, indicating that no message length has been found for the received frame Accordingly, the embodiment of FIG. 6 is able to completely remove the impact of the choice of the initial threshold $\Delta_{init}$, provided additional memory devices are provided to store all computed δ values in the prescribed order. In addition, the block error rate of this embodiment outperforms that of the conventional decoding method under different SNR conditions. Furthermore, the embodiment as depicted in FIG. 6 requires lesser number of trace backs in the Viterbi decoder such that the computational burden is alleviated accordingly.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for Blind Transport Format Detection decoding of signals having at least a message block of k-bit from a length candidate set $S=\{s_1, s_2, \ldots s_i\}$, wherein the k message bits are encoded by a cyclic redundancy check encoder and processed by a convolutional encoder to generate encoded data, comprising:
   initializing a value of an integer, i;
   decoding a received frame to form a decoded sequence that includes an $s_i$-bit message and an error correcting code;
   calculating a path metric value, $\delta(s_i)$;
   comparing $\delta(s_i)$ with a dynamic path selection threshold value to determine whether to trace back the decoded sequence;
   repeating the decoding, calculating, and comparing steps for at least one other integer value of i if $\delta(s_i)$ is greater than the threshold value; and
   if $\delta(s_i)$ is less than or equal to the threshold value, tracing back the decoded sequence, performing cyclic redundancy check processing, performing a cyclic redundancy check, and updating the threshold value to be $\delta(s_i)$, wherein $\delta(s_i)$ is less than or equal to the threshold value for at least one value of i.

2. The method of claim 1, wherein the repeating step further comprises increasing the value of i by 1 and repeating at least the decoding, calculating and comparing steps.

3. The method of claim 2, further comprising repeating the increasing step for all integers between 1 and a number of length candidates in the length candidate set, and wherein the number of length candidates in the length candidate set is an integer.

4. The method of claim 1, further comprising setting the threshold value to an initial value of $\Delta_{init}$.

5. The method of claim 1, further comprising a step of determining a message length when the threshold value has been updated.

6. The method of claim 1, wherein the decoding step includes convolutional decoding.

7. The method of claim 1, wherein the step of initializing the value of i includes setting the value of i to 1.

8. A method for Blind Transport Format Detection signal processing of at least a message block of k-bit from a length candidate set $S=\{s_1, s_2, \ldots s_i\}$, comprising:
   encoding the k message bits with a cyclic redundancy check encoder;
   processing the encoded message bits by a convolutional encoder;
   receiving the encoded message;
   initializing a value of an integer, i;
   decoding a received frame to form a decoded sequence that includes an $s_i$-bit message and an error correcting code;
   calculating a path metric value, $\delta(s_i)$;
   comparing $\delta(s_1)$ with a dynamic path selection threshold value to determine whether to trace back the decoded sequence;
   repeating the decoding, calculating, and comparing steps for at least one other integer value of i if $\delta(s_i)$ is greater than the threshold;
   and
   if $\delta(s_i)$ is less than or equal to the threshold value, tracing back the decoded sequence, performing cyclic redundancy check processing, performing a cyclic redundancy check, and updating the threshold value to be $\delta(s_i)$, wherein $\delta(s_i)$ is less than or equal to the threshold value for at least one value of i.

9. The method of claim 8, wherein the repeating step further comprises increasing the value of i by 1 and repeating at least the decoding, calculating and comparing steps.

10. The method of claim 8, further comprising setting the threshold value to an initial value of $\Delta_{init}$.

11. The method of claim 8, further comprising a step of determining a message length when the threshold value has been updated.

12. A system for Blind Transport Format Detection decoding of signals having at least a message block of k-bit from a length candidate set $S=\{s_1, S_2, \ldots s_i\}$, wherein the k message bits are encoded by a cyclic redundancy check (CRC) encoder and processed by a convolutional encoder to generate encoded data, comprising:
   means for setting a dynamic path selection threshold value $\Delta$ to an initial value $\Delta_{init}$;
   means for decoding the received frame to form a decoded sequence that includes an $s_i$-bit message and an error correcting code;
   means for calculating a path metric value, $\delta(s_i)$;
   means for comparing $\delta(s_i)$ with the threshold value to determine whether to trace back the decoded sequence;
   means for tracing back the decoded sequence if $\delta(s_i)$ is less than or equal to the threshold;
   means for checking error correcting code; and
   means for updating threshold to be $\delta(s_i)$ if $\delta(s_i)$ is less than or equal to the threshold value, wherein $\delta(s_i)$ is less than or equal to the threshold value for at least one integer value of i.

13. The system of claim 12, further comprising means for determining a message length if the threshold value has been updated by the means for updating the threshold to be $\delta(s_i)$.

14. The system of claim 12, wherein the means for decoding the received frame comprises a convolutional decoder.

15. The system of claim 12, wherein the means for checking error correcting code comprises a CRC decoder.

16. The system of claim 12, wherein the means for tracing back comprises a Viterbi decoder.

17. A method for Blind Transport Format Detection decoding of signals having at least a message block of k-bit from a length candidate set $S=\{s_1, s_2, \ldots s_i\}$, wherein the k message bits are encoded by a cyclic redundancy check encoder and processed by a convolutional encoder to generate encoded data, comprising:
(a) decoding the received frame to form a decoded sequence that includes an $s_i$-bit message and an error correcting code;
(b) calculating path metric values ($\delta(s_i)$ values) for all message length candidates within the message length candidate set;
(c) sorting a plurality of $\delta(s_i)$ values in an order;
(d) setting j to an integer within an integer set;
(e) tracing back the decoded sequence associated with $\delta(s_{(j)})$;
(f) determining whether the decoded sequence is associated with the error correcting code; and if the decoded sequence is not associated with the error correcting code,
(g) setting j to another integer within the integer set; and
(h) repeating steps (e)-(g) until the first of the decoded sequence is associated with the error correcting code or all integers within the integer set are exhausted.

18. The method of claim 17, further comprising determining a message length.

19. The method of claim 17, wherein the step of sorting a plurality of $\delta(s_i)$ values comprises sorting in an ascending order, $\delta(s_{(1)}) \leq \delta(s_{(2)}) \leq \ldots$, where $s_{(j)}$ is a message length candidate corresponding to a j-th smallest $\delta$ value.

20. The method of claim 17, whereat the step of decoding includes a step of convolutional decoding.

21. The method of claim 17, whereat the step of determining whether the decoded sequence is associated with the error correcting code is performed by means of cyclic redundancy check.

22. A system for processing a received frame, comprising:
means for providing a message length candidate set $S=\{s_1, s_2, \ldots s_N\}$;
means for decoding the received frame to form a decoded sequence that includes an $s_i$-bit message and an error correcting code;
means for calculating path metric values ($\delta(s_{(i)}$ values) for all message length candidates within the message length candidate set;
means for sorting all $\delta(s_i)$ values in a ascending order $\delta(s_{(1)}) \leq \delta(s_{(2)}) \ldots$, where $s_{(j)}$ is the message length candidate corresponding to the j-th smallest $\delta$ value;
means for setting j to an integer within an integer set $\{1, 2, \ldots, N\}$;
means for tracing back the decoded sequence associated with $\delta(s_{(j)})$;
means for checking the error correcting code;
means for setting j to another integer within the integer set; and
means for repeating steps of tracing back the decoded sequence, checking the error correcting code and setting j to another integer until the first of the error correcting code check passes or all integers within the integer set are exhausted.

23. The system of claim 22, further comprising means for determining a legitimate message length if the decoded sequence is associated with the error correcting code.

24. The system of claim 22, wherein the means for decoding the received frame is a convolutional decoder.

25. The system of claim 22, wherein the means for checking the error correcting code is a cyclic redundancy check (CRC) decoder.

26. A method for Blind Transport Format Detection decoding of signals having at least a message block of k-bit from a length candidate set $S=\{s_1, s_2, \ldots s_l\}$, wherein the k message bits are encoded by a cyclic redundancy check encoder and processed by a convolutional encoder to generate encoded data, comprising:
(a) decoding the received frame to form a decoded sequence that includes an $s_i$-bit message and an error correcting code;
(b) calculating path metric values ($\delta(s_i)$ values) for all message length candidates within the message length candidate set;
(c) sorting all $\delta(s_i)$ values in a particular order;
(d) setting j to an integer within an integer set $\{1, 2, \ldots, N\}$;
(e) tracing back the decoded sequence associated with $\delta(s_{(j)})$;
(f) determining whether the decoded sequence is associated with the error correcting code; and if the decoded sequence is not associated with the error correcting code,
(g) setting j to another integer within the integer set; and
(h) repeating steps (e)-(g) until the first of the decoded sequence is associated with the error correcting code or all integers within the integer set are exhausted.

27. The method of claim 26, further comprising determining a message length.

28. The method of claim 26, wherein the step of sorting a plurality of $\delta(s_i)$ values comprises sorting in an ascending order, $\delta(s_{(1)}) \leq \delta(s_{(2)}) \leq \ldots$, where $s_{(j)}$ is a message length candidate corresponding to a j-th smallest $\delta$ value.

29. The method of claim 26, whereat the step of decoding includes a step of convolutional decoding.

30. The method of claim 26, whereat the step of determining whether the decoded sequence is associated with the error correcting code is performed by means of cyclic redundancy check.

* * * * *